(12) United States Patent
Boozer et al.

(10) Patent No.: US 7,644,086 B2
(45) Date of Patent: Jan. 5, 2010

(54) COMPUTER-IMPLEMENTED AUTHORIZATION SYSTEMS AND METHODS USING ASSOCIATIONS

(75) Inventors: John F. Boozer, Cary, NC (US); Brian P. Bowman, Apex, NC (US)

(73) Assignee: SAS Institute Inc., Cary, NC (US)

( * ) Notice: Subject to any disclaimer, the term of this patent is extended or adjusted under 35 U.S.C. 154(b) by 85 days.

(21) Appl. No.: 11/092,138

(22) Filed: Mar. 29, 2005

(65) Prior Publication Data
US 2006/0224590 A1  Oct. 5, 2006

(51) Int. Cl.
*G06F 7/00* (2006.01)
*G06F 17/30* (2006.01)

(52) U.S. Cl. .................... 707/9; 707/2; 707/3; 707/6; 707/10; 726/2; 726/27

(58) Field of Classification Search ............ None
See application file for complete search history.

(56) References Cited

U.S. PATENT DOCUMENTS

| | | | | |
|---|---|---|---|---|
| 5,261,102 A * | 11/1993 | Hoffman | | 726/19 |
| 5,335,346 A * | 8/1994 | Fabbio | | 711/163 |
| 5,742,759 A * | 4/1998 | Nessett et al. | | 726/4 |
| 5,941,947 A * | 8/1999 | Brown et al. | | 709/225 |
| 6,192,361 B1 * | 2/2001 | Huang | | 707/9 |
| 6,286,005 B1 | 9/2001 | Cannon | | |
| 6,292,798 B1 * | 9/2001 | Dockter et al. | | 707/9 |
| 6,374,292 B1 * | 4/2002 | Srivastava et al. | | 709/206 |
| 6,470,079 B1 | 10/2002 | Benson | | |
| 6,530,081 B1 * | 3/2003 | Hayes, Jr. | | 717/176 |
| 6,928,398 B1 | 8/2005 | Fang et al. | | |
| 6,941,472 B2 | 9/2005 | Moriconi et al. | | |
| 6,976,090 B2 | 12/2005 | Ben-Shaul et al. | | |
| 7,069,585 B1 * | 6/2006 | Chess et al. | | 726/9 |
| 7,136,871 B2 | 11/2006 | Ozer et al. | | |
| 7,171,411 B1 * | 1/2007 | Lewis et al. | | 707/9 |
| 7,210,167 B2 * | 4/2007 | Brezak et al. | | 726/18 |
| 7,254,547 B1 | 8/2007 | Beck et al. | | |
| 7,370,344 B2 * | 5/2008 | Boozer et al. | | 726/2 |

(Continued)

FOREIGN PATENT DOCUMENTS

WO  0157706  8/2001

OTHER PUBLICATIONS

Bradlow, Eric T. et al., "Subscale Distance and Item Clustering Effects in Surveys: A New Metric", Journal of Marketing Research, vol. 38, No. 2, pp. 1-24, May 2001.

(Continued)

*Primary Examiner*—Hosain T Alam
*Assistant Examiner*—Usmaan Saeed
(74) *Attorney, Agent, or Firm*—Jones Day

(57) ABSTRACT

Computer-implemented systems and methods for determining whether to authorize one or more operations with respect to resource objects. A system and method can include receiving a request that would involve an operation with respect to a resource object. The requested resource object may have multiple associations with other objects. One or more data stores are used to store interrelationships among resource objects, authorization-related objects, and access permission information. A comparison is performed using permissions and the requester's access credential information. The comparison is used to determine whether to permit the operation with respect to the resource object.

19 Claims, 16 Drawing Sheets

U.S. PATENT DOCUMENTS

| | | | |
|---|---|---|---|
| 2002/0099952 A1* | 7/2002 | Lambert et al. | 713/200 |
| 2002/0129135 A1* | 9/2002 | Delany et al. | 709/223 |
| 2002/0138572 A1* | 9/2002 | Delany et al. | 709/204 |
| 2003/0110246 A1* | 6/2003 | Byrne et al. | 709/223 |
| 2003/0174178 A1* | 9/2003 | Hodges | 345/848 |
| 2003/0236979 A1* | 12/2003 | Himmel et al. | 713/167 |
| 2004/0148409 A1* | 7/2004 | Davis et al. | 709/229 |
| 2004/0230829 A1* | 11/2004 | Dogan et al. | 713/200 |
| 2004/0254934 A1* | 12/2004 | Ho et al. | 707/9 |
| 2005/0154885 A1* | 7/2005 | Viscomi et al. | 713/165 |
| 2005/0204143 A1* | 9/2005 | Ellington | 713/182 |
| 2006/0041582 A1* | 2/2006 | Hekmatpour | 707/102 |
| 2006/0080316 A1* | 4/2006 | Gilmore et al. | 707/9 |
| 2006/0137019 A1* | 6/2006 | Dettinger et al. | 726/27 |
| 2007/0240106 A1* | 10/2007 | Manson et al. | 717/110 |

OTHER PUBLICATIONS

Chen, Qimei et al., "Attitude toward the Site", Journal of Advertising Research, pp. 27-37, Sep.-Oct. 1999.

Cheung, Natasha, "Should organisations be tempted by the option of outsourcing their CRM applications?", Outward bound, Information Age, Jul. 13, 2001, http://www.information-age.com/article/2001/july/outward_bound (last visited Mar. 15, 2007) [5 pp.].

Chung, Chanjin et al., "Determinants of Temporal Variations in Generic Advertising Effectiveness", Agribusiness, vol. 16, No. 2, pp. 197-214, 2000.

Dawar, Niraj, "Extensions of Broad Brands: The Role of Retrieval in Evaluations of Fit", Journal of Consumer Psychology, 5(2), pp. 189-207, 1996.

Dholakia, Utpal M. et al., "What makes commercial Web pages popular?", European Journal of Marketing 32, 7/8, pp. 724-736, 1998.

Aaker, David A. et al., "On Using Response Latency to Measure Preference", Journal of Marketing Research, vol. XVII, pp. 237-244 (May 1980).

Bass, Frank M. et al., "Testing Distributed Lag Models of Advertising Effect", Journal of Marketing Research, vol. 9, pp. 298-309 (Aug. 1972).

Blair, Margaret Henderson, "An Empirical Investigation of Advertising Wearin and Wearout", Journal of Advertising Research, pp. 45-51 (Dec. 1987/Jan. 1988).

Cannon, Hugh M. et al., "Effective Reach and Frequency: Does It Really Make Sense?", Journal of Advertising Research, pp. 19-28 (Mar./Apr. 1994).

Clarke, Darral G., "Econometric Measurement of the Duration of Advertising Effect on Sales", Journal of Marketing Research, vol. XIII, pp. 345-357 (Nov. 1976).

Corkindale and Newall, "Advertising Thresholds and Wearout", European Journal of Marketing, vol. 12, No. 5, pp. 329-350 (1978).

Hu, Teh-Wei et al., "The State Antismoking Campaign and the Industry Response: The Effects of Advertising on Cigarette Consumption in California", The American Economic Review, vol. 85, No. 2, Papers and Proceedings of the Hundredth and Seventh Annual Meeting of the American Economic Association Washington, DC, Jan. 6-8, 1995, pp. 85-90 (May 1995).

Krishnamuthi, Lakshman et al., "Intervention Analysis of a Field Experiment to Assess the Buildup Effect of Advertising", Journal of Marketing Research, vol. XXIII, pp. 337-345 (Nov. 1986).

Lee, Jonq-Ying et al., "Lag Structures in Commodity Advertising Research", Agribusiness, vol. 8, No. 2, pp. 143-154 (1992).

Liu, Donald J. et al., "Generic Fluid Milk Advertising, Demand, Expansion, and Supply Response: The Case of New York City", Amer. J. Agr.Econ., pp. 229-236 (1988).

Pham, Michel Tuan et al., "Analyzing the Memory Impact of Advertising Fragments", Marketing Letters, 8:4, pp. 407-417 (1997).

Pritchett, James G. et al., "Optimal Choice of Generic Milk Advertising Expenditures by Media Outlet," Journal of Agricultural and Resource Economics, vol. 23, No. 1, pp. 155-169 (1998).

Simon, Julian L. et al., "The Shape of the Advertising Response Function", Journal of Advertising Research, vol. 20, No. 4, pp. 11-28 (Aug. 1980).

Tellis, Gerard J. et al., "Does TV Advertising Really Affect Sales? The Role of Measures, Models, and Data Aggregation", Journal of Advertising, vol. 24, No. 3, pp. 1-12 (Fall 1995).

Vakratsas, Demetrios et al., "How Advertising Works: What Do We Really Know?", Journal of Marketing, vol. 63, pp. 26-43 (Jan. 1999).

Venkateswaran, Meenakshi et al., "Modeling Advertising Carryover in Fluid Milk: Comparison of Alternative Lag Specifications", Agricultural and Resource Economics Review, vol. 22, No. 1, pp. 10-19 (Apr. 1993).

Wilkins, Nick et al., "Economic Analysis of Tobacco Demand", World Bank Economics of Tobacco Toolkit, Tool 3. Demand Analysis, (2001) [105 pp.].

* cited by examiner

| Assoc ObjRef | ObjTyp1 | ObjTyp2 | ObjRef1 | ObjRef2 | AssocRole |
|---|---|---|---|---|---|
| ASSOC_0041 | ProtObj$_1$ | ACE$_1$ | TABLE_0010 | ACE_0005 | ACCESSCONTROLS |
| ASSOC_0487 | ProtObj$_1$ | ACE$_2$ | TABLE_0010 | ACE_0009 | ACCESSCONTROLS |
| ASSOC_0004 | ProtObj$_1$ | ACE$_3$ | TABLE_0010 | ACE_0014 | ACCESSCONTROLS |
| ASSOC_0021 | ACE$_1$ | PERMISSION$_1$ | ACE_0005 | PERM_0004 | PERMISSIONS |
| ASSOC_0003 | ACE$_1$ | PERMISSION$_2$ | ACE_0005 | PERM_0009 | PERMISSIONS |
| ASSOC_0007 | ACE$_1$ | PERMISSION$_3$ | ACE_0005 | PERM_0002 | PERMISSIONS |
| ASSOC_0104 | ACE$_1$ | PERSON$_1$ | ACE_0005 | PERSON_0012 | IDENTITIES |
| ASSOC_0099 | ACE$_1$ | GROUP$_1$ | ACE_0005 | GROUP_0003 | IDENTITIES |
| ASSOC_0011 | ACE$_2$ | PERMISSION$_1$ | ACE_0009 | PERM_0004 | PERMISSIONS |
| ASSOC_0094 | ACE$_2$ | GROUP$_1$ | ACE_0014 | GROUP_0004 | IDENTITIES |
| ASSOC_0014 | ACE$_3$ | PERMISSION$_1$ | ACE_0014 | PERM_0001 | PERMISSIONS |
| ASSOC_0024 | ACE$_3$ | PERMISSION$_2$ | ACE_0014 | PERM_0003 | PERMISSIONS |
| ASSOC_0002 | ACE$_3$ | PERSON$_1$ | ACE_0014 | PERSON_0033 | IDENTITIES |

Fig. 4

Inputs:
  Association Container Entries Resulting from Query 1:

| Assoc ObjRef | ObjTyp1 | ObjTyp2 | ObjRef1 | ObjRef2 | |
|---|---|---|---|---|---|
| ASSOC_0041 | ProtObj$_1$ | ACE$_1$ | TABLE_0010 | ACE_0005 | — 382 |
| ASSOC_0487 | ProtObj$_1$ | ACE$_2$ | TABLE_0010 | ACE_0009 | — 384 |
| ASSOC_0004 | ProtObj$_1$ | ACE$_3$ | TABLE_0010 | ACE_00014 | — 386 |

Permission Cache ObjRef and Index Entries
  for Required Permission "Write":

| Permission Name | DENY ObjRef | Index | GRANT ObjRef | Index |
|---|---|---|---|---|
| Write | PERM_0003 | 0 | PERM_0004 | 1 |

402 ↗    406 ↗    404 ↗    408 ↗

⟍ 400

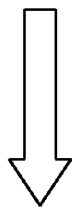

Results:

| Assoc ObjRef | ObjTyp1 | ObjTyp2 | ObjRef1 | ObjRef2 | |
|---|---|---|---|---|---|
| ASSOC_0021 | ACE$_1$ | PERMISSION$_1$ | ACE_0005 | PERM_0004 | — 432 |
| ASSOC_0011 | ACE$_2$ | PERMISSION$_1$ | ACE_0009 | PERM_0004 | — 434 |
| ASSOC_0024 | ACE$_3$ | PERMISSION$_2$ | ACE_0014 | PERM_0003 | — 436 |

Inputs:

Association Container Entry Resulting from Query 2:

| Assoc ObjRef | ObjTyp1 | ObjTyp2 | ObjRef1 | ObjRef2 | |
|---|---|---|---|---|---|
| ASSOC_0021 | ACE$_1$ | PERMISSION$_1$ | ACE_0005 | PERM_0004 | — 432 |
| ASSOC_0011 | ACE$_2$ | PERMISSION$_1$ | ACE_0009 | PERM_0004 | — 434 |
| ASSOC_0011 | ACE$_3$ | PERMISSION$_2$ | ACE_0014 | PERM_0003 | — 436 |

— 430

"Betty's" Credential

| Identity Object Reference | Level |
|---|---|
| PERSON_0033 | 0 |
| GROUP_0003 | 1 |

502
504

— 500

510

Results:

600

| Assoc ObjRef | ObjTyp1 | ObjTyp2 | ObjRef1 | ObjRef2 |
|---|---|---|---|---|
| ASSOC_0099 | ACE$_1$ | GROUP$_1$ | ACE_0005 | GROUP_0003 |
| ASSOC_0002 | ACE$_3$ | PERSON$_1$ | ACE_0014 | PERSON_0033 |

| ClassType | Rule |
|---|---|
| Column | ASSOCIATION:OwningTable |
| DataTable | ASSOCIATION:TablePackages |
| ⋮ | ⋮ |

Fig. 20

| ClassType | Rule |
|---|---|
| Column | ASSOCIATION:OwningTable |
| DataTable | XPATH://Trees[@TreeType='Security'] |
| ⋮ | ⋮ |

Fig. 21

| ClassType | Rule |
|---|---|
| Column | ASSOCIATION:OwningTable |
| DataTable | XPATH://Trees[@TreeType='Security'] |
| RelationalTable | IGNORE_SUPERCLASS |
| RelationalTable | ASSOCIATION:TablePackages |
| ⋮ | ⋮ |

COMPUTER-IMPLEMENTED AUTHORIZATION SYSTEMS AND METHODS USING ASSOCIATIONS

TECHNICAL FIELD

This relates generally to computer-implemented data access methods and systems and more particularly to data access security mechanisms.

BACKGROUND

Many computer systems have to cope with a diverse set of users requesting access to resources stored within systems. An example of users requesting access involves requests to access a directory-based file system. In this situation, access may be determined by defining access boundaries through analysis of a straightforward hierarchical convention involving the resource.

As an illustration, FIG. 1 depicts a directory-based file system having a straightforward hierarchical convention 30 wherein its items have one parent. The top-level directory "C:\" 32 occupies the top position in the directory hierarchy and is a hierarchical parent of the subdirectories "MYDIR" and "PUBLIC" (34 and 36). Subdirectory MYDIR 34 is itself a parent of the "TEST1.XLS" file 38. Subdirectory PUBLIC 36 is a parent of the "TEST2.XLS" file 40 and "TEST3.XLS" file 42. This type of directory hierarchical structure allows for relatively straightforward security access due in part to the single parent nature of the items in the hierarchy. However, security access issues substantially increase in difficulty when a computer system involves more complex items and relationships.

SUMMARY

In accordance with the teachings provided herein, systems and methods for operation upon data processing devices are provided for determining authorization with respect to resource objects. As an example, a system and method can be configured to determine whether to authorize a request that would involve an operation with respect to a resource object. The requested resource object may have multiple associations with other objects. One or more data stores are used to store interrelationships among resource objects, authorization-related objects, and access permission information. The authorization-related objects are configured to specify whether a requester should be granted or denied access to a requested object. The one or more data stores are queried in order to determine which authorization-related objects are associated with the requested resource object and in order to determine which permissions are associated with the determined authorization-related objects. A comparison is performed between the determined permissions and the requester's access credential information. The comparison is used to determine whether to permit the operation with respect to the resource object.

BRIEF DESCRIPTION OF THE DRAWINGS

FIG. 4 is a table depicting association entries for the objects shown in FIG. 3.

FIGS. 6-8 are tabular representations of inputs and results of multiple queries being performed to determine authorization to a protected object.

FIGS. 19-21 are exemplary tables of inheritance rules utilized by a data access security system.

DETAILED DESCRIPTION

Figure 1:
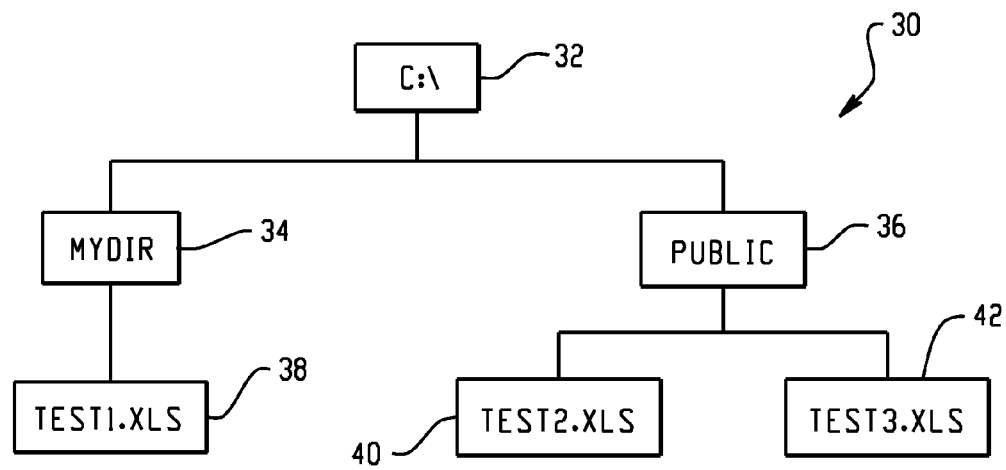
FIG. 1 depicts a hierarchical convention used with directory-based file systems.
Figure 2:
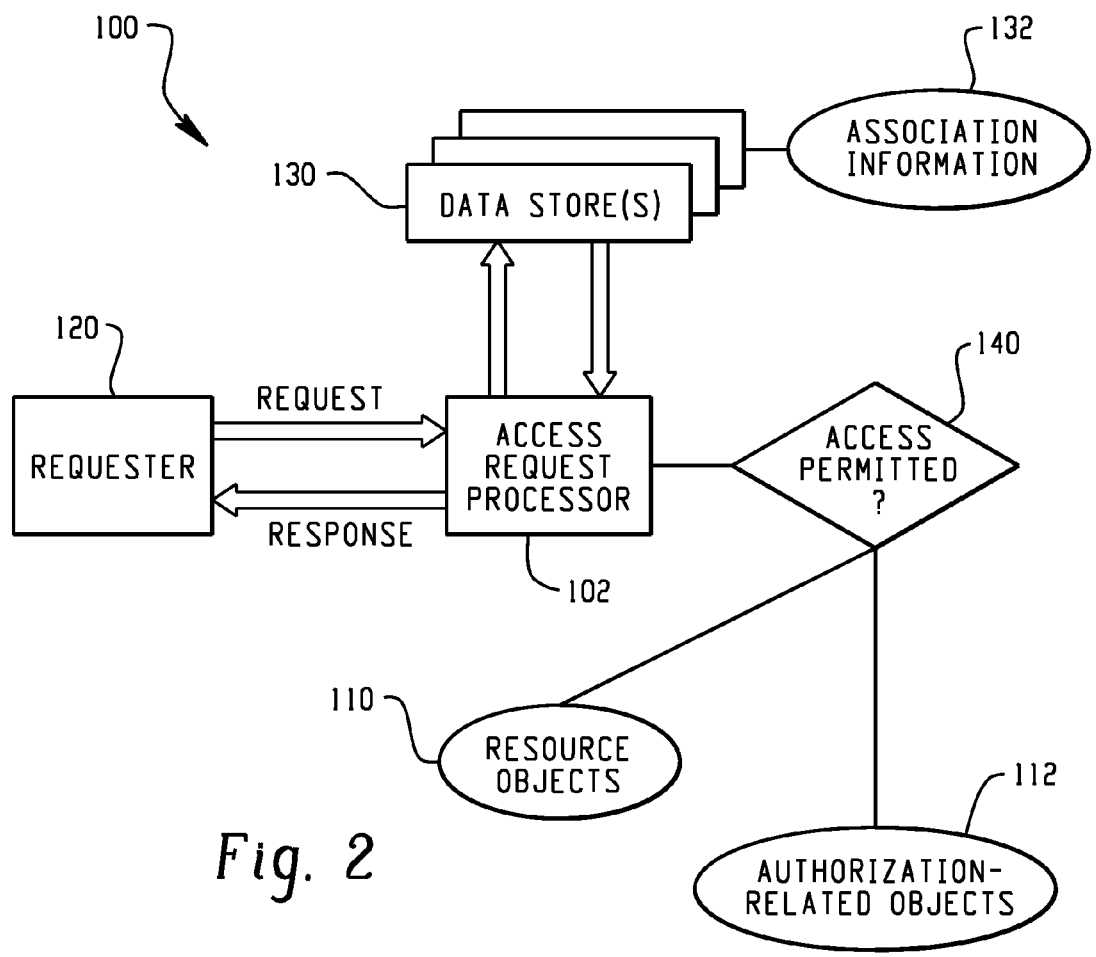
FIG. 2 depicts a block diagram of computer and software components utilized in a data access security system.

FIG. 2 depicts at 100 an access authorization system wherein an access request processor 102 determines whether a request to access a resource object 110 should be granted. The access request processor 102 receives a request from a requester 120 to access a resource object 110. The requester 120 can be a human or a computer program that is requesting the access to a resource object 110.

As part of its processing, the access request processor 102 accesses one or more data stores 130. The data stores 130 contain information 132 about which resource objects 110 are associated with which authorization-related objects 112. Association information 132 is used by the access request processor 102 to determine whether authorization should be granted to the requester 120.

Figure 3:
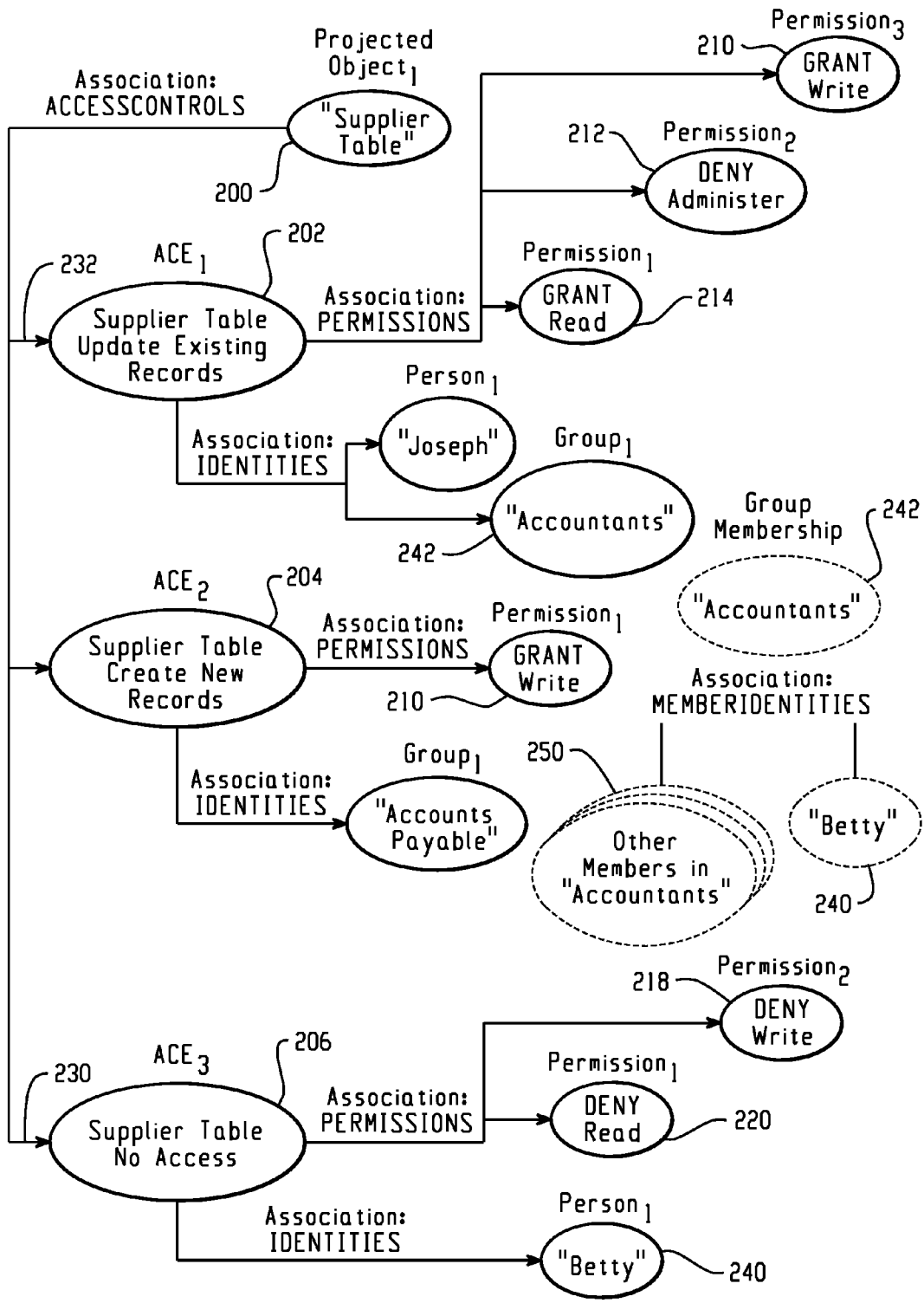
FIG. 3 is an object model diagram illustrating a protected object with multiple associated authorization-related objects.

FIG. 3 depicts a resource object 200 that is protected by multiple associated authorization-related objects (e.g., access control entry objects 202, 204, 206 and permission objects 210, 212, 214, 218, 220). An oval-shaped shape represents an object (e.g., protected resource object 200) and the line connecting it to another object represents their association (e.g., association 230 that connects protected object 200 with access control entry object 206). An association represents an object with attributes that map the association between two "related" objects of different types.

The model shown in FIG. 3 can apply to various classes of objects (e.g. "Table", "Column", "ServerConnection", etc.). Each object class represents a type that has a set of attributes and associations. A container includes a persisted collection of objects of the same type. Each container can be stored as a relational table with columns representing object attributes and rows containing actual object data. A container can be queried when objects of its type are requested.

An association object describes the linkage between two objects related by type. These association objects can be queried and intermediate query results can be aggregated for final authorization determination. An object which can be involved in an association is an Access Control Entry (ACE)

object. An Access Control Entry (e.g., ACE 202) is related by association objects to the following: the object that it protects; one or more permission objects; and one or more identity objects.

A system can be configured to use association containers by recognizing that information to determine authorization is contained in associations between authorization-related objects. Association objects can reside in their own association container that is queried during associated objects requests. With this configuration, a system does not have to query or instantiate actual permission objects (e.g., objects 210, 212, 214, 218, 220).

The objects shown in FIG. 3 are used in the following example to illustrate how several association container queries can be used to determine authorization for a protected object request. An object (e.g., protected object 200) is "protected" by one or more sets of associated authorization-related objects (e.g., objects 202, 204, 206). In general, authorization-related objects may include, but are not limited to, access control, permission, identity, permission condition, and/or association objects which are further illustrated below.

The model shown in FIG. 3 may be extended to include memberships. Persons and groups may be placed in a group membership, such as the Betty person object 240 and other member objects 250 can be placed in an accountants group membership object 242.

The example utilizes the table data depicted in FIG. 4 in order to determine whether to grant or deny a requested operation relative to the protected object 200. FIG. 4 shows the association container entries for the objects shown in FIG. 3. In the table of FIG. 4, ObjTyp1 and ObjTyp2 values correspond to the objects described in FIG. 3. For example, the association object reference ASSOC_0041 in row 300 of the table in FIG. 4 corresponds to association 232 on FIG. 3 which associates protected object 200 with ACE 202. For each row in the table of FIG. 4, the related ObjRef1 and ObjRef2 values are the actual object references.

Figure 5:
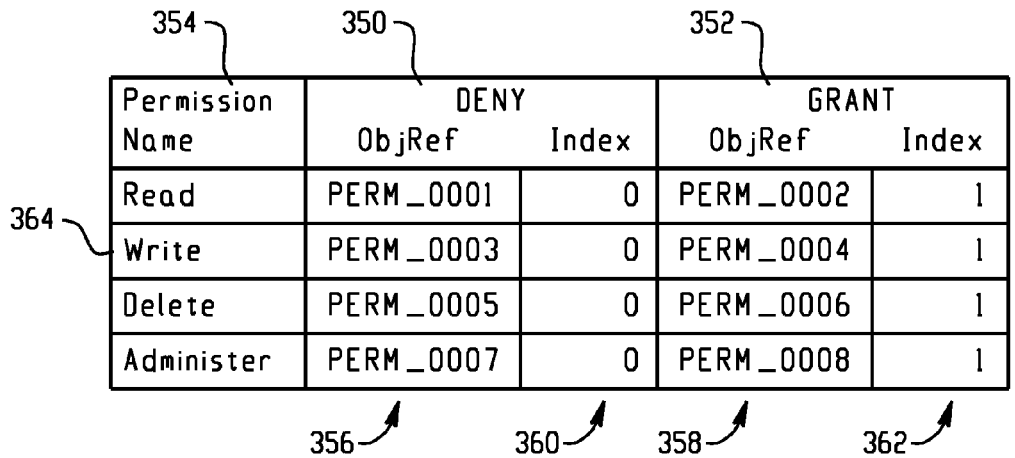
FIG. 5 is a table depicting a permissions data store.

The system can be configured to store other information, such as permission information stored in cache. As shown in FIG. 5, a permissions cache can be an in-memory list of the permission objects (e.g., objects 212, 214, 218, 220 shown in FIG. 3). It can be created by reading the defined permission objects (e.g., objects 210, 212, 214, 218, 220 shown in FIG. 3), extracting object references (e.g., PERM_0001 . . . PERM_0008 shown in FIG. 5) for each DENY/GRANT object pair (e.g., columns 350 and 352 shown in FIG. 5), and creating a corresponding entry for each permission name 354. Accordingly, a permission name 354 value in the permissions cache has corresponding object references (356, 358) for both DENY and GRANT permission objects. The index values (360, 362) provide an abstraction indicating DENY (0) or GRANT (1).

When an authorization decision is needed, the permissions cache is searched for a match on the required permission name. The result is a set of DENY/GRANT ObjRefs and corresponding index values. In the final stage of the authorization process, the matching permission index and values (aggregated from an earlier stage) are used to determine if the user is granted or denied authorization to the requested protected object.

In this example and as shown in FIG. 3, a person 240 named "Betty" is a summer student and a member of the "Accountants" Group 242. A user may also be a member of one or more groups represented by group objects. A group can be an object representing a collective identity. A group has "members" comprised of multiple users and/or other groups which share a collective identity. Group objects can also be associated to other groups to form a nested group membership hierarchy.

A credential list can be used to indicate which credentials are associated with which user identities. A credential list begins with a user object reference, which represents the requesting user, and can be structured such that the remaining list entries contain group object references for which the user has either direct or indirect membership as shown in the following table:

| The Credential Identity Object Reference | LEVEL |
| --- | --- |
| USER_0001 | 0 |
| GROUP_0004 | 1 |
| GROUP_0005 | 1 |
| GROUP_0011 | 2 |
| GROUP_0029 | 2 |

The Level column indicates the nesting depth of group memberships. Level 0 is the user; Level 1 represents direct membership of the user in a group; and values greater than 1 represent groups nested within other groups. Level values determine identity precedence during authorization computation.

With reference back to the example, as Betty is clicking through an application, "Betty" 240 unknowingly attempts an operation on the "Supplier Table" 200 which requires GRANT Write Permission. It must now be determined if "Betty" has this Permission.

The following query arguments are available from the request context:
- The Object Reference for the requested Protected Object: "Supplier Table" 200.
- The name of the required Permission: "Write".
- The requesting user's Credential (a list of Identity Object References): "Betty's Credential".

These elements are used to formulate association container queries. By the end of the last query, the intermediate results are reduced to an aggregated set that determines authorization.

More specifically in determining authorization, a first query is performed to obtain association objects for all ACEs corresponding to the requested protected object. The inputs for the first query are shown at 370 in FIG. 6. The inputs include the reference of the requested protected object 200 "TABLE_0010" and specify that the required association of interest in the first query is "ACE". The association object container query can be formulated with respect to the table of FIG. 4 as: ObjRef1 EQ "TABLE_0010" AND AssocRole EQ "ACCESSCONTROLS".

Figure 6:
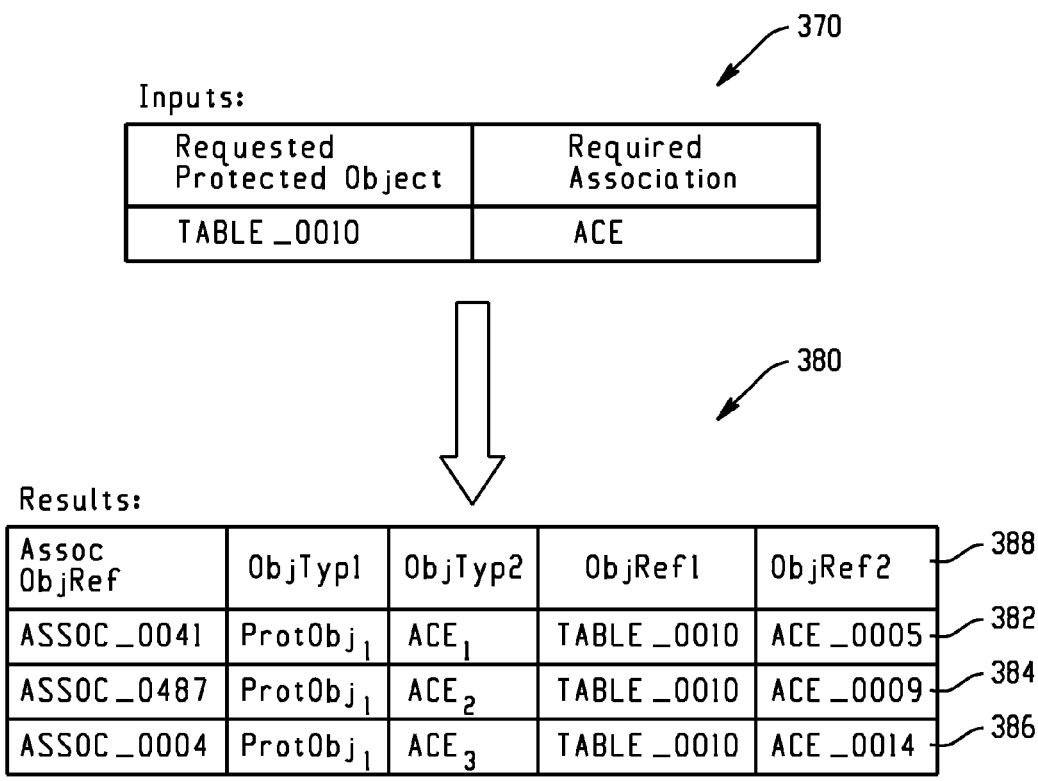

The results of the first query are shown at 380 in FIG. 6. Rows 382, 384, and 386 comprise the results 380 because rows 302, 304, and 306 from the table of FIG. 4 contain both "TABLE_0010" as its ObjRef1 and AssocRole EQ "ACCESSCONTROLS".

A second query uses the results 380 of the first query to determine relevant permissions ObjRefs. The permission ObjRefs in this example corresponding to "Write" in the permissions cache of FIG. 5 are "PERM_0003" and "PERM_0004" in row 364 of FIG. 5, and thus these ObjRefs (402, 404) of FIG. 7 are included as input to the second query.

These inputs to the second query are shown at 400 in FIG. 7. With these inputs 400, an association object container query can be formulated with respect to the table of FIG. 4 as follows: ObjRef1 IN ("ACE_0005", "ACE_0009", "ACE_0014") AND ObjRef2 IN ("PERM_0003", "PERM_0004").

The query generates the results shown in FIG. 7 at 430. Results 430 are from rows 310, 312, and 314 of the table in FIG. 4 because rows 310, 312, and 314 contain one of the input ACEs as an ObjRef1 and contain one of the input permissions as an ObjRef2.

After the second query completes, the ObjRef2 value(s) from the resulting association object(s) are matched against the permission cache entry ObjRef values used in the query expression. The corresponding permission DENY/GRANT index values are mapped in order to keep track of each ACE represented by the ObjRef1 value(s) in the second query results. After the third query completes, these permission DENY/GRANT index values are used for authorization determination.

More specifically, the third query can be configured to determine the association objects that represent the intersection of ACE ObjRefs 440 that associate to the required permission (as reduced by the second query) and the identity ObjRefs corresponding to the requesting user's credential list 500 shown in FIG. 8. The credentials 500 provides identity ObjRef values needed to determine the intersection between any ACEs that associate to the required "Write" permission and to any of user Betty's identities (e.g., "PERSON_0033" 502, "GROUP_0003" 504). In this example, Betty's identity "PERSON_0033" 502 (i.e., "Betty" person 240 of FIG. 3) has a permission index value of "0" that represents a DENY permission, and Betty's identity "GROUP_0003" 504 (i.e., "Accountants" group 242 of FIG. 3) has a permission index value of "1" that represents a grant permission.

With these inputs 510, the third query can be expressed as: ObjRef1 IN ("ACE_0005", "ACE_0009", "ACE_0014") AND ObjRef2 IN ("PERSON_0033", "GROUP_0003").

The third query generates results shown in FIG. 8 at 600. Results 600 are from rows 320 and 322 of the table in FIG. 4 because rows 320 and 322 contain one of the input ACEs as an ObjRef1 and contain one of Betty's identities as an ObjRef2.

After the third query completes, a mapping (established from the second query results and which contains an entry for each selected ACE ObjRef along with the correct DENY (0) or GRANT (1) index value) is consulted to match the permission corresponding ACE ObjRefs to the ObjRef1 value(s) from the third query results. This mapping provides the corresponding DENY (0) or GRANT (1) index value for the intersection of identity and ACE. Using authorization precedence rules, these values determine if the user is granted or denied authorization to the requested protected object.

Authorization precedence rules can be based on the lowest identity and permission index values as aggregated from the second and third queries. This means that person "Betty" has a higher precedence than any group in which she has membership. Once the highest precedence identity (e.g., which in this example is represented by the lowest index value) is located, then its permission is checked.

In this example, user "Betty" is denied "Write" permission to protected object "Supplier Table," because even though she is granted "Write" via membership in the "Accountants" group, the DENY associated via ACE₃ to her person object takes precedence.

Figure 9:
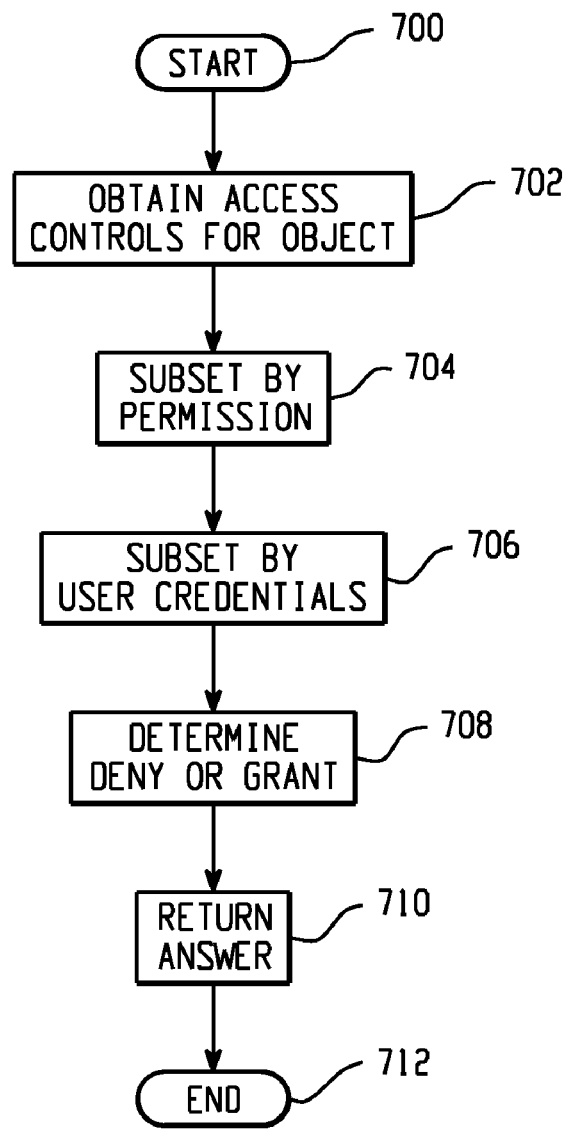
FIG. 9 is a flowchart illustrating a system-level operational scenario of an authorization computation process.

FIG. 9 provides a system-level operational scenario of an authorization computation process. Start indicator 700 indicates that at step 702 the access controls for a requested object is obtained. In this operational scenario, access controls are data structures describing the permissions that identities have to an object. It should be understood that access controls may be implemented as objects themselves.

To compute the authorization, one or more queries are performed. At step 704, a query is performed in order to obtain a subset by permission. In this example, an authorization request for an object corresponds to a requested permission. Access controls associated with the requested object are subset by this requested permission.

At step 706, access controls that matched the requested permission in step 704 are further subset by identities that match the requesting user. These identities could also include any groups in which the user has membership. Based upon whether the access controls from step 706 match both the requesting user and the requested permission, step 708 determines a DENY or GRANT authorization. At step 710, the computed answer of either DENY or GRANT is returned, before processing concludes for this operational scenario at end indicator 712.

Figure 10:
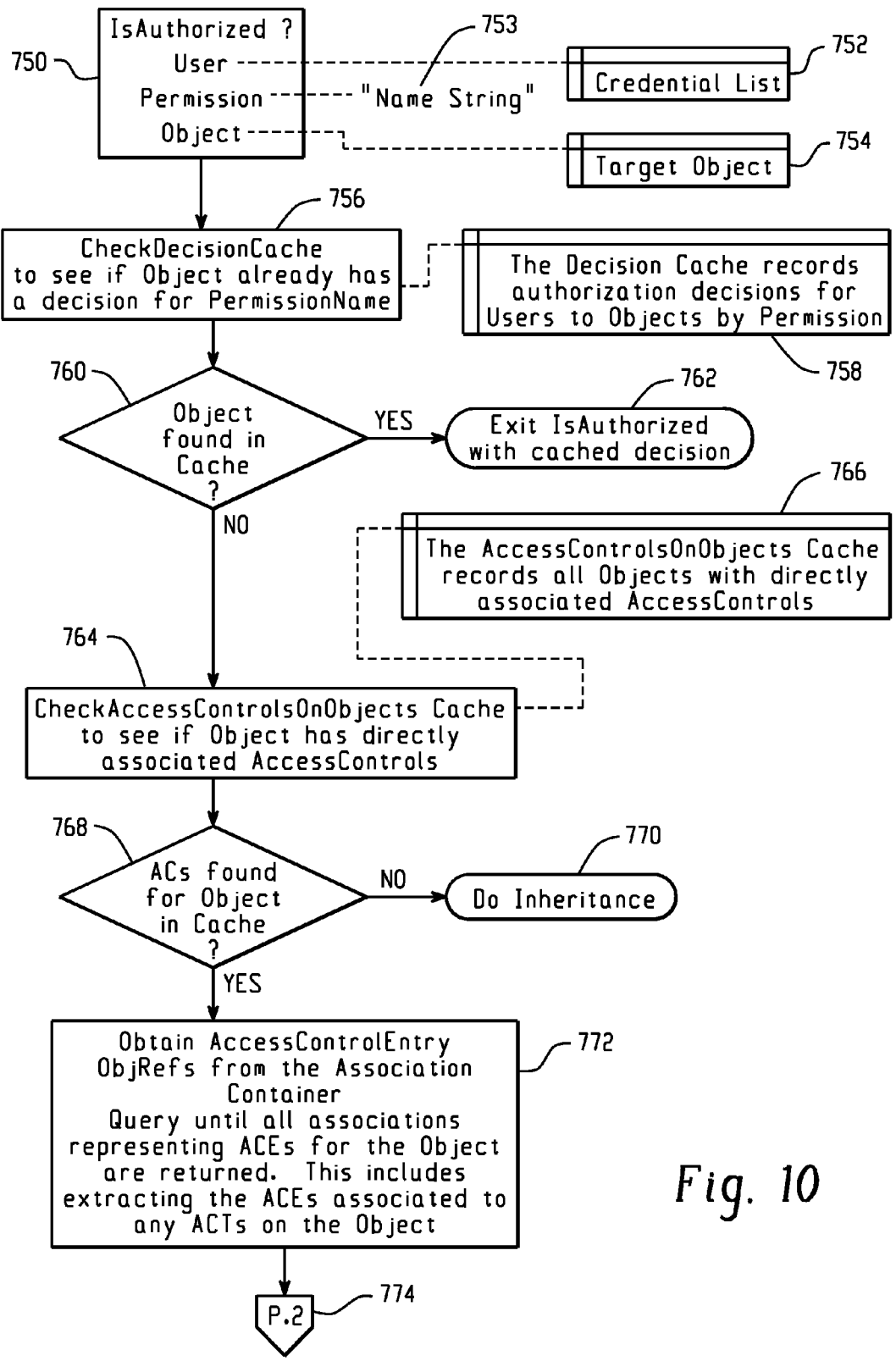
FIGS. 10-12 are flowcharts illustrating another operational scenario of an authorization process in an object server environment.
Figure 11:
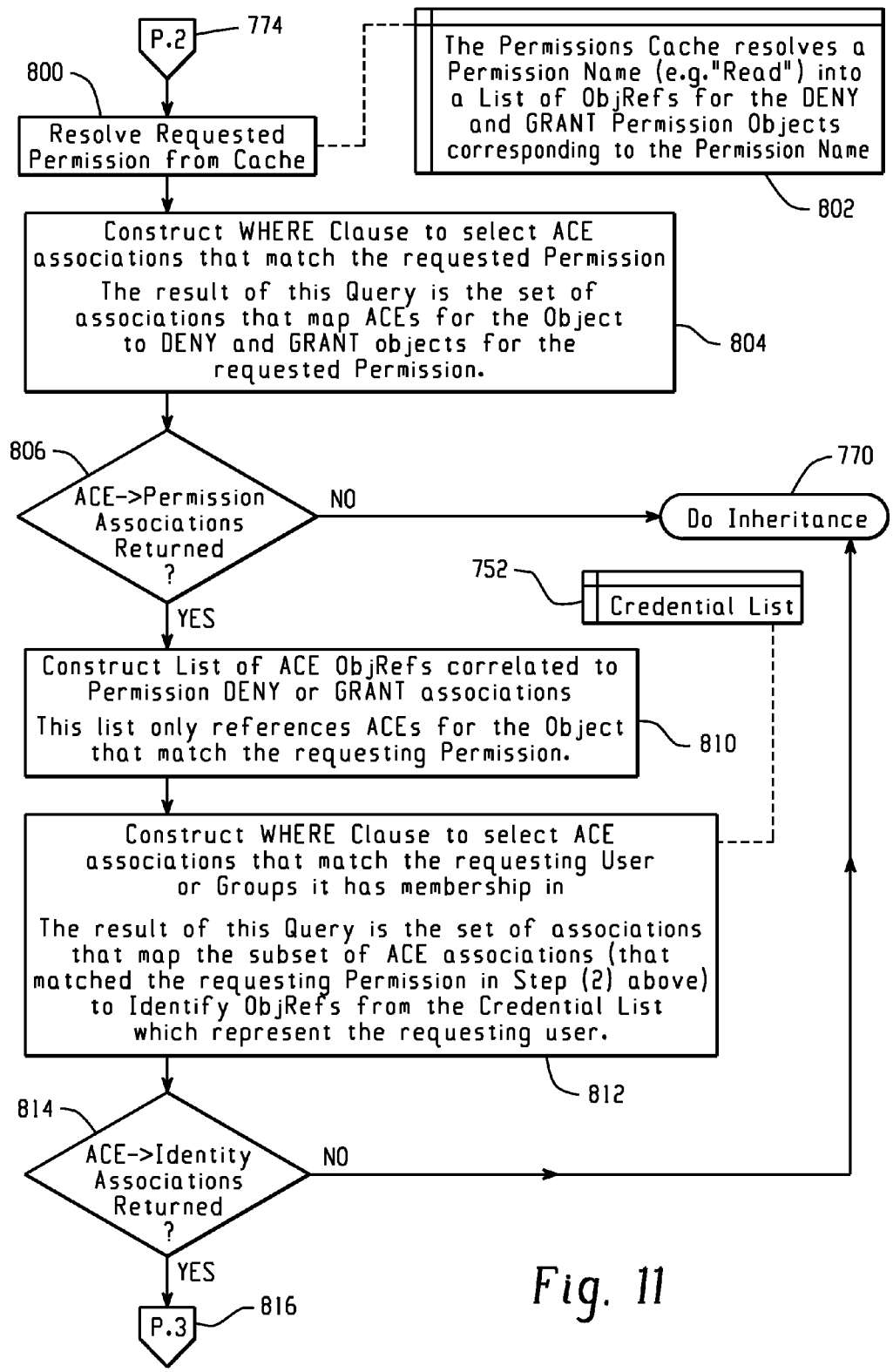
Figure 12:
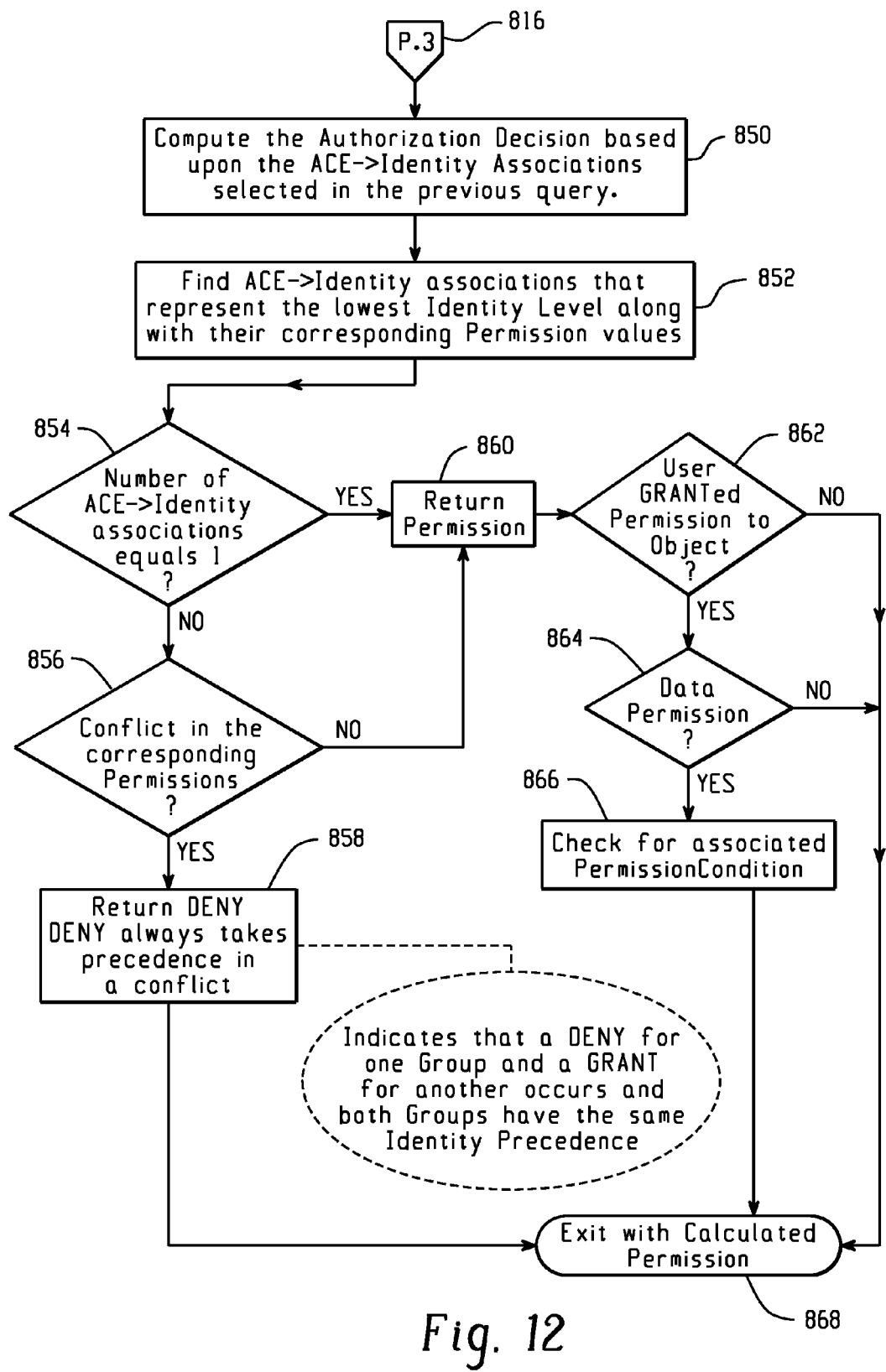

FIGS. 10-12 provide an operational scenario of an authorization process within an object server environment. In this object server operational scenario, only the associations between the access controls, permissions, and identities are queried and subset. This can provide a more efficient way for computing authorization in an object server environment. In this object server operational scenario, three inputs for the authorization request (i.e., requesting user, requested permission name, and requested object) are specified as object references. This allows mapping of the required permission name to a set of permission object references to determine authorization. The traversal of authorization-related object sets is based only on queries to one or more object association containers and only object references in this example are compared. A sequence of association table queries create intermediate subsets of access control-related object references that are used to determine authorization.

With reference to FIG. 10, to process a request for a target object 754, step 750 begins the process of determining if a user has permission to the object 754. The intersection of a requesting user, requested permission, and target object form authorization request values.

The processing also involves a user credential list 752 which is a list of ObjRefs representing the requesting user and any groups this user has membership in. Processing includes a permission name string 753 which can be a text string containing the name of the permission.

Step 756 accesses a decision cache 758 for determining whether a decision for a specific set of authorization request values has already been rendered. (After an initial authorization decision is computed for a specific set of authorization request values, the result is stored in the decision cache 758.) Decision step 760 determines whether a decision for a specific set of authorization request values is found in the decision cache 758. If the decision is already in the decision cache 758, then processing for this operational scenario concludes at exit indicator 762. Otherwise, processing proceeds to step 764.

Step 764 determines if authorization is to be computed for the target object by checking AccessControlsOnObjects cache 766. The AccessControlsOnObjects cache 766 has an entry for each object with one or more direct access controls. Decision step 768 examines whether any access controls were found for the target object in cache 766. If an entry is found for the requested object, then processing proceeds to step 772 to evaluate by association. Otherwise processing continues at step 770 by examining if the object inherits authorization from a defined inheritance parent. The inheritance operations of process 770 are described in the commonly assigned U.S.

Patent Application Pub No.: US 2004/0205355 A1 (Boozer et al.) which is incorporated herein by reference. Inheritance operations are also discussed herein in FIGS. 15-21.

If processing reaches step 772, then a first query is performed at step 772. At step 772, the ObjRef is obtained for each AccessControlEntry (ACE) associated to the object in the specific set of authorization request values. This includes direct ACEs plus any ACEs coming from any AccessControlTemplate (ACT) for the object. An ACT is a named collection of associated ACEs forming a reusable authorization pattern that may be applied to multiple objects. Processing continues at step 800 on FIG. 11 as shown by continuation indicator 774.

At step 800 in FIG. 11, the permission is resolved from its name-string format into the list of ObjRefs that represent the corresponding DENY and GRANT objects for the permission. Permissions cache 802 maps each valid permission name to an ObjRef list where each entry on the list has a corresponding value indicating DENY or GRANT.

At step 804, the ObjRefs of the ACEs protecting the target object along with the ObjRefs corresponding to the permission are used to construct a WHERE clause for use in a second query that selects the associations of ACEs that map to the permission. If decision step 806 determines that none of the ACE associations match the requesting permission then the inheritance process 770 is performed to see if the object inherits authorization from a defined inheritance parent.

If decision step 806 determines that one or more ACE associations match the requesting permission, then processing continues at step 810. At step 810, associations from the second query that matched the requested permission yield a set of ACE ObjRefs (from the first query) that represent only the ACEs that map to DENY or GRANT permissions for the requested permission. This set of ACE->Permission ObjRefs, along with the DENY or GRANT is placed on a list that is passed on to a third query which is performed by step 812. This list represents the ACEs that match the permission and the object.

At step 812, the ObjRefs of all ACEs selected in the second query along with the ObjRefs contained in the credential list for the requesting user are used to construct a WHERE clause for the third query that selects associations of ACEs for the requested permission that map any ObjRef representing the user or groups the user has membership in. If none of the ACE associations match as determined at decision step 814, then the process continues by looking to see if the object inherits authorization from a defined inheritance parent at process 770. However if one or more of the ACE associations match as determined at decision step 814, then processing continues at step 850 on FIG. 12 as indicated by continuation marker 816.

At step 850 on FIG. 12, the third query returns a set of ACE->Identity associations that contain ObjRefs matching one or more of the ObjRefs in the user credential list. The authorization decision is computed from this.

At step 852, the authorization decision is computed by finding the lowest level ACE->Identity association that matches the actual user (or one of the groups it has membership in—as found in the credential list) in the returned ACE->Identity associations. If only one match occurred as determined by decision step 854, then the corresponding DENY or GRANT is returned at step 860. If more than one ACE->Identity association match occurred as determined at decision step 854, and if decision step 856 determines that there are conflicting permissions (i.e., DENY and GRANT are present), according to precedence rules then DENY is returned at step 858 before processing concludes for this object server operational scenario at end block 868.

If decision step 856 determines that there are no conflicts in the corresponding permissions, then processing continues at step 860 wherein the permission is returned. If decision step 862 determines that DENY was returned from step 860, then processing concludes at exit block 868. However if GRANT was returned, then decision step 864 checks for a "Data Permission." Data Permissions are a subset of valid permission names that can have an associated PermissionCondition. A PermissionCondition is a filter expression returned to the requesting users that is to be applied against the data for further authorization control. If the associated PermissionCondition exists as checked at step 866, then it is returned along with the GRANT decision. The authorization computation exits at end block 868 with the calculated permission. As shown by this operational scenario, the overhead for computing authorization is reduced by sub-setting the associations that link access control-related objects, instead of querying and processing the authorization-related objects directly.

It should be understood that similar to the other processing flows described herein, one or more of the steps and the order of the steps in the flowchart may be altered, deleted, modified and/or augmented and still achieve the desired outcome. For example, although in this operational scenario, three queries are performed, it should be understood that fewer queries or more queries may be performed in order to meet the situation at hand and to take advantage of different data organization structures of the tabular access control information.

Figure 13:
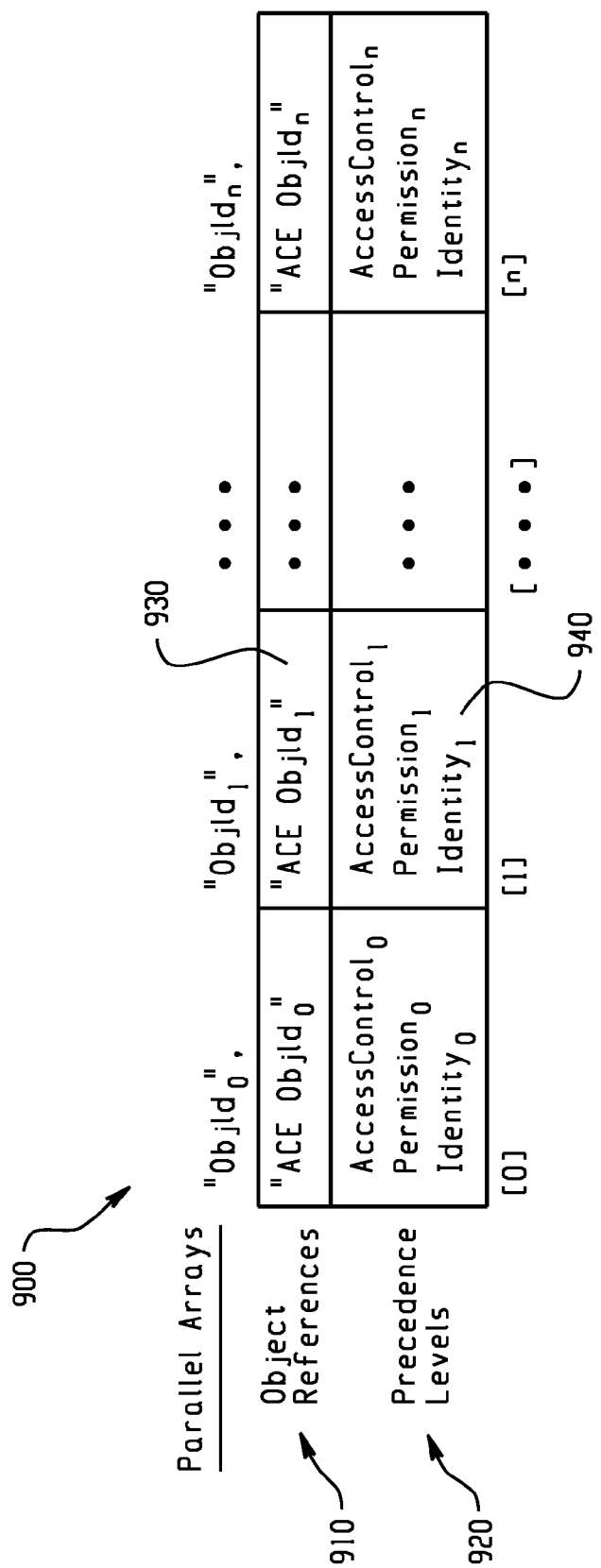
FIG. 13 is a data structure diagram illustrating a data store for maintaining object reference subsets.

For the authorization process, a data type can be included which utilizes dynamically sized parallel arrays to maintain object references and precedence levels for the entities that are part of an authorization computation. As shown in FIG. 13, dynamic state arrays 900 (e.g., "INLists") maintain these object reference subsets. The first part 910 of an INList contains object references in a form that can be directly substituted into a WHERE clause for a query. Each object reference has a corresponding vector 920 of integer values where authorization precedence levels are stored as the authorization determination process progresses. These precedence levels correspond to access control nesting depth, permission DENY/GRANT, and identity nesting (e.g., group membership) depth. A one-to-one correspondence can be used between an object reference and a set of precedence levels. For example, "ObjId$_1$," 930 has a precedence level 940 that includes AccessControl$_1$, Permission$_1$, and Identify$_1$.

For example, to setup for an authorization computation, an initial INList is constructed from an association table query that returns authorization-related objects for a requested protected object. The object references array contains the actual authorization-related object IDs returned from this query, in a string format that can be passed directly on a WHERE clause query against the association table. The access control level values in the corresponding parallel precedence levels array can contain a nesting level value. Multiple INList instances can be used during the authorization computation process for performing association table queries and storing intermediate results.

While examples have been used to disclose the invention, including the best mode, and also to enable any person skilled in the art to make and use the invention, the patentable scope of the invention is defined by claims, and may include other examples that occur to those skilled in the art. For example, many different actions may be granted or denied for a resource object, such as "Administer," "Delete," etc.

Figure 14:
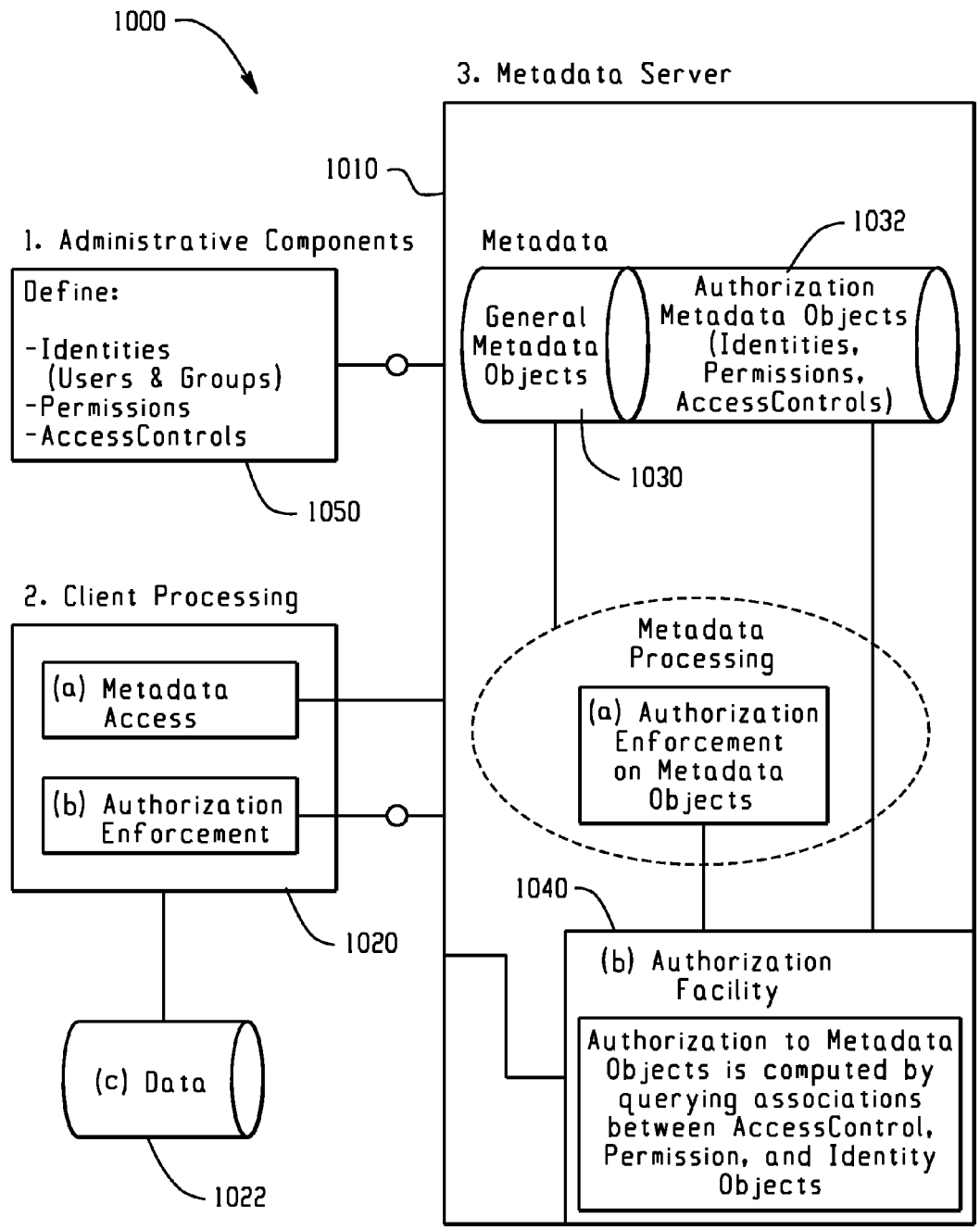
FIG. 14 is a block diagram illustrating a metadata object server environment.

As another example, the systems and methods disclosed herein may be used in many different applications, such as in a metadata server environment illustrated at 1000 in FIG. 14. In FIG. 14, a metadata server 1010 supports multiple, concurrent users (e.g., client 1020) issuing requests to query or manipulate metadata objects 1030 of various defined types and that are serviced by client processing module 1020.

The server 1010 can be a multi-threaded, concurrent object server to handle object requests from many simultaneous users and enforces authorization via module 1040 at object-level granularity. This enforcement utilizes authorization-related objects 1032 to determine if a user has permission to perform the required action on a requested object 1030.

An object server 1010 can be implemented using an object/relational model. Conceptually this model defines various classes of objects (e.g. "Table", "Column", "ServerConnection", etc.). Each object class represents a type that has a set of attributes and associations. Objects of the same class reside in a physical container. A container can be stored as a relational table with columns representing object attributes and rows containing actual object data. An association represents an object with attributes that map the association between two "related" objects of different types. Association objects reside in their own association container that is queried during associated objects requests.

Administrative clients 1050 define authorization-related objects: identities (users & groups), permissions, and Access-Controls 1032 in the metadata server 1010. Various clients (e.g., client 1050) employ the metadata server 1010 to manage metadata objects (which define information about data, application assets, etc.).

The client 1020 regulates access to data 1022 by employing the authorization facility 1040 to enforce authorization on proxy metadata objects 1030 that represent the data 1022. The term "proxy as in "proxy metadata objects" signifies a resource external to the metadata server 1010 (e.g., a resource that is not a metadata object). The metadata server 1010 can be configured to not only render authorization decisions when accessing metadata objects directly but also as a generalized authorization facility for external systems that register proxy metadata objects.

During enforcement, multiple queries obtain authorization-related objects from their respective containers. This accrues an overhead that substantially impacts the total cost of authorization. Minimizing these container queries not only reduces this cost, but also results in fewer instantiated objects which further reduces the total cost of authorization.

The object metadata server 1010 can be configured to perform authorization using only the association objects linking authorization-related objects. For the metadata object server environment, this results in only several (e.g., three) queries—all to the association container. The association objects already define authorization-related object relationships and contain the object references necessary to determine authorization for a protected object request.

Figure 15:
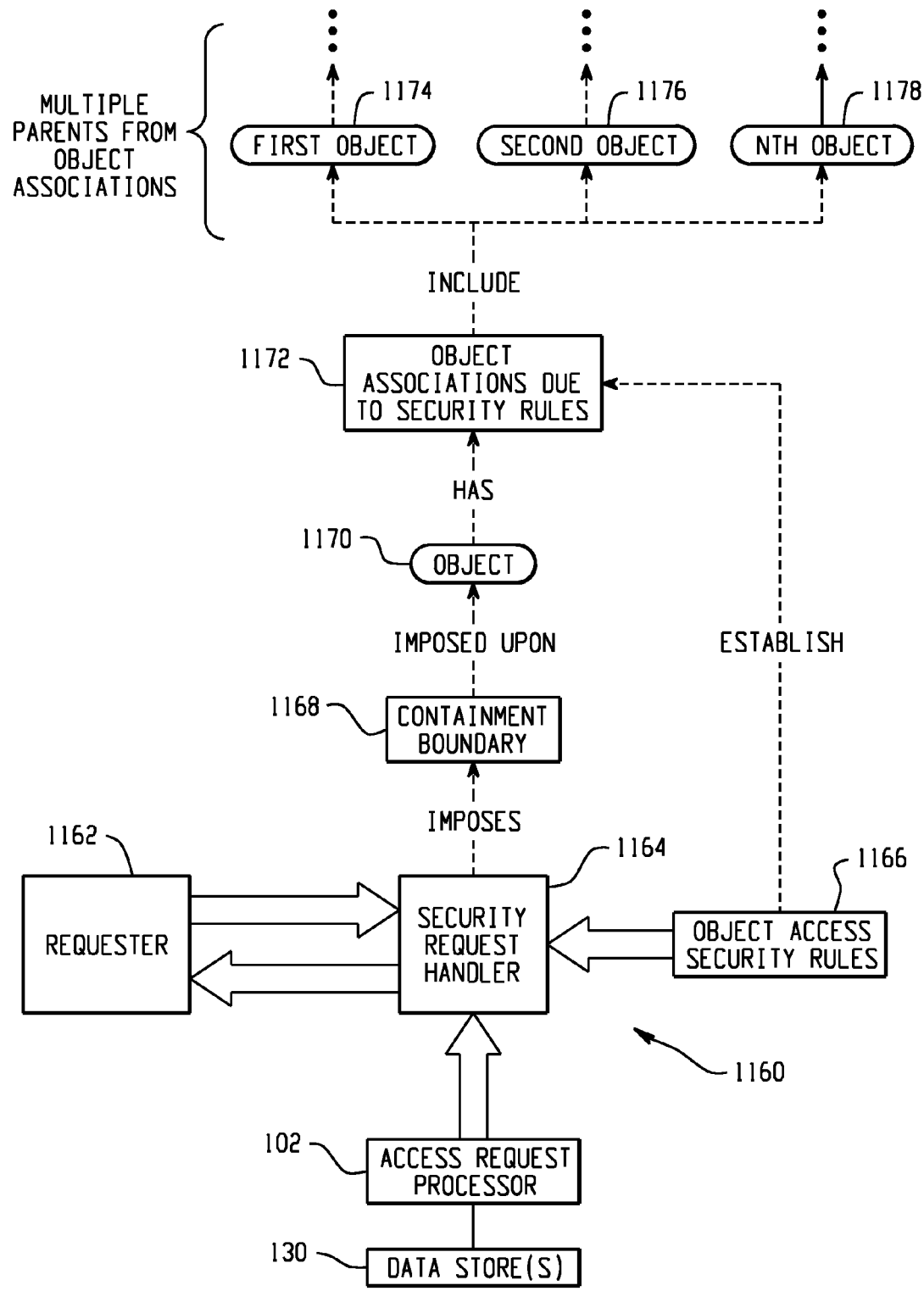
FIG. 15 depicts a block diagram of computer and software components utilized in a data access security system that includes inheritance operations.

As another example of the broad scope of the systems and methods disclosed herein, authorization inheritance operations can be performed in conjunction with the systems and methods disclosed herein. FIG. 15 depicts a data access security system 1160 for accessing information stored within a data storage unit or units. The stored information is retrieved through resource objects (1170, 1174, 1176, 1178) which are interconnected through a complex set of relationships or associations 1172. Associations 1172 define conceptual relationships between an instance of one class and an instance of another class. For example, objects may be associated to higher level container objects, such as a column object having an association to the table within which it is found as well as to other objects. The table object may itself have multiple associations, such as to libraries and trees within which it is located. In this respect, an object 1170 may have associations 1172 to multiple objects (1174, 1176, 1178).

A requester 1162, such as a computer program or a person using a computer program, furnishes a request for information located in the database. A requester 1162 may be asking for any type of information, such as information about company employee salaries or positions. A security request handler software module 1164 receives the request and examines whether the requester 1162 should be granted access to all or any of the requested information as well as what kinds of operations the requester 1162 may perform on that information.

The security request handler 1164 determines whether to grant authorization to a requested object by using access request processor software instructions 102. The access request processor 102 retrieves information from one or more data stores 130 that store interrelationships among resource objects, authorization-related objects, and access permission information. The authorization-related objects are configured to specify whether a requester should be granted or denied access to a requested object. The one or more data stores 130 are queried in order to determine which authorization-related objects are associated with the requested resource object and in order to determine which permissions are associated with the determined authorization-related objects. A comparison is performed between the determined permissions and the requester's access credential information. The comparison is used by the security request handler 1164 to determine whether to permit the accessing of the resource object.

If authorization cannot be determined through the access request processor 102, then the security request handler 1164 uses inheritance operations to analyze authorization. For inheritance operations, the security request handler 1164 processes the request by constructing a containment boundary 1168 around the object that is involved in the request. The containment boundary 1168 determines objects that act as containers or parents and are used when evaluating who can have access to the object. Object security rules 1166 help form the containment boundary 1168 by specifying what object associations 1172 are involved in constructing the containment boundary 1168. Because, an object 1170 may have multiple associated objects (1174, 1176, 1178), object access security rules 1166 specify which object associations 1172 are to be used in constructing the containment boundary 1168. Because, an object 1170 may have multiple associated objects (1174, 1176, 1178), the object may have multiple security parents. The object may have one or more parents through a class inheritance hierarchy whose security rules may be inherited by the object.

The object access security (e.g., inheritance) rules 1166 may also specify that certain conditions should be considered in determining which requesters can permeate the containment boundary 1168. As an illustration, containment boundaries may be established for objects by setting up object access security rules based on inheritance rules that describe how to traverse from an object of a class to the related object with which it is associated. The security information that is obtained from traversing among objects according to the object access security rules is used to determine whether the requester 1162 should be granted access. Accordingly, security rules 1166 act as containment rules in determining which objects (e.g., 1174, 1176, 1178) are contained within the containment boundary based upon the requested object 1170; and then Access Control Entry (ACE) objects (associated with the objects (e.g., 1170, 1174, 1176, 1178) that are contained within the containment boundary 1168) specify whether access should be granted.

Figure 16:
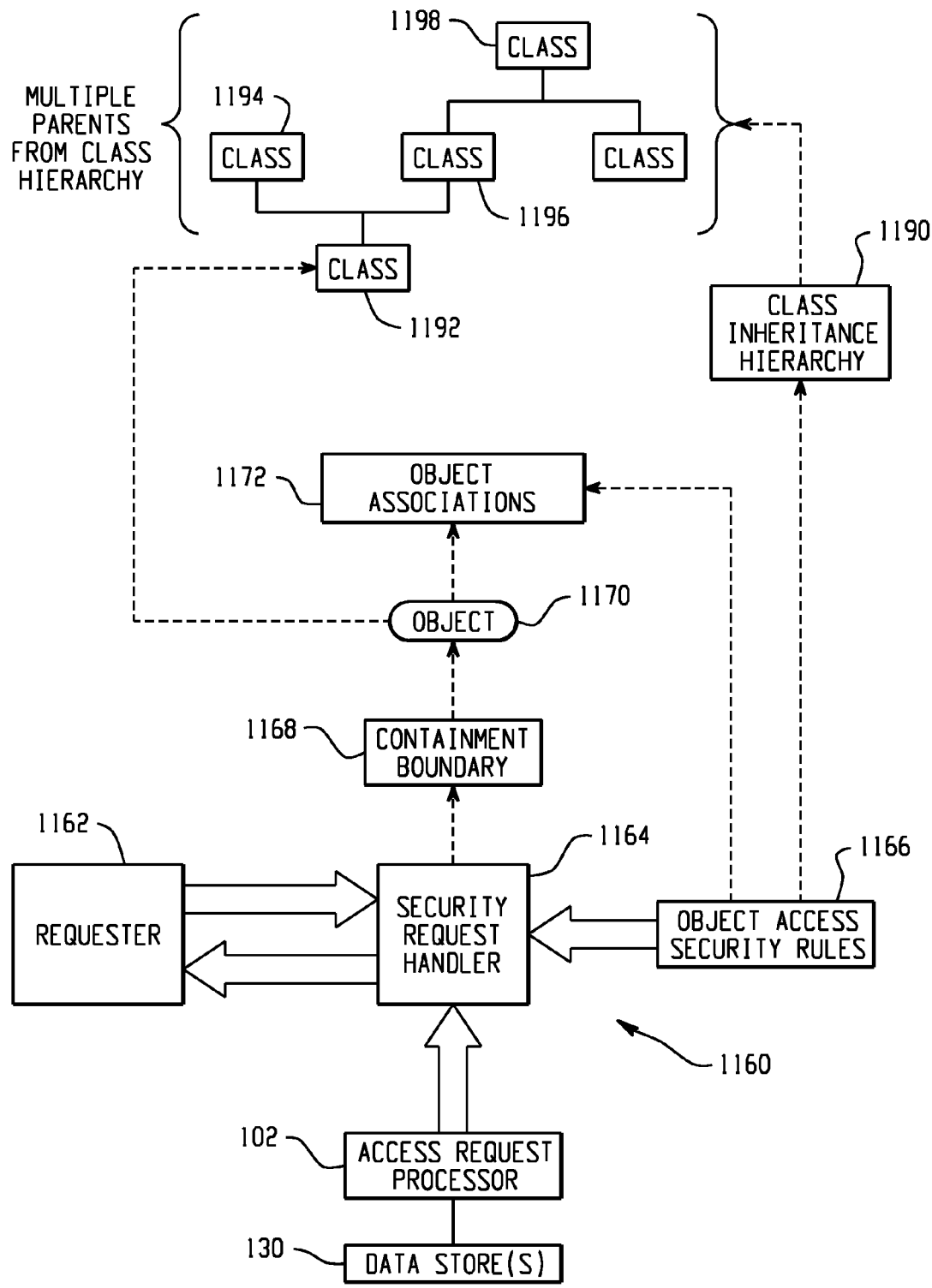
FIG. 16 depicts a block diagram wherein object class structure is utilized within a data access security system.

In addition to looking up rules that are tied to class associations, the security request handler 1164 may also examine (as shown in FIG. 16) security rules 1166 inherited from the objects' ancestor classes in the class inheritance hierarchy 1190. Based upon the hierarchy 1190, child objects (e.g., 1170) know from what parent object(s) they are to inherit. For example, child object 1170 from class 1192 inherits from parent classes 1194, 1196, and 1198. (It should be understood that many different class inheritance hierarchies may be used.) The security request handler 1164 is capable of evaluating the inheritance rules and aggregating security information through the inheritance hierarchy 1190 to make an authorization decision. A set of rules 1166 can be defined once on a parent class and affect all of its child classes. Optionally, child classes can augment inherited rules or choose to ignore one or more of the inheritable rules from ancestor classes.

With such an approach, containment boundaries are constructed by setting up a series of rules 1166, based upon class, that describe how to traverse from an object of that class to a related object from which it should acquire its security, as well as (if desired) based upon inheriting rules from ancestor classes in a class hierarchy tree.

Figure 17:
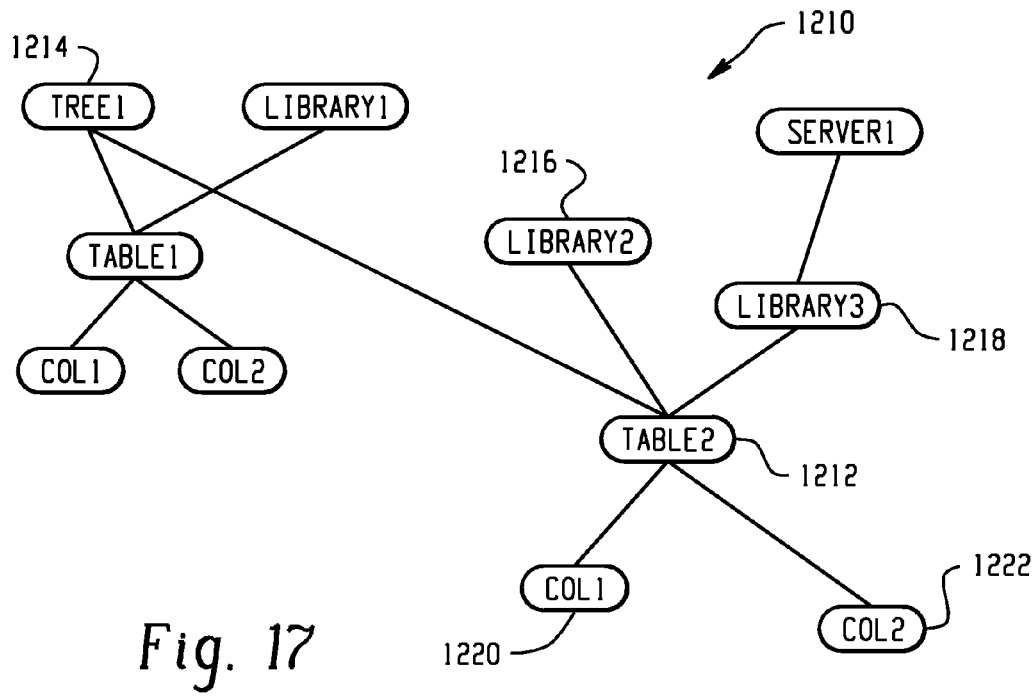
FIG. 17 is an object model diagram depicting relationships among multiple objects.

To further illustrate the range of associations with which objects can become involved, FIG. 17 depicts at 1210 objects with lines between them that represent object associations. For example, the object "table2" 1212 has associations with objects "tree1" 1214, "library2" 1216, "library3" 1218, "col1" 1220, and "col2" 1222. FIG. 17 also visually demonstrates that such networks of associations do not easily (if at all) form a top-down hierarchy. This weblike network of relationships may arise for many reasons, such as to allow objects to relate to one another in flexible and dynamic ways. There are many paths to and from objects, unlike those in a hierarchical organization.

Figure 18:
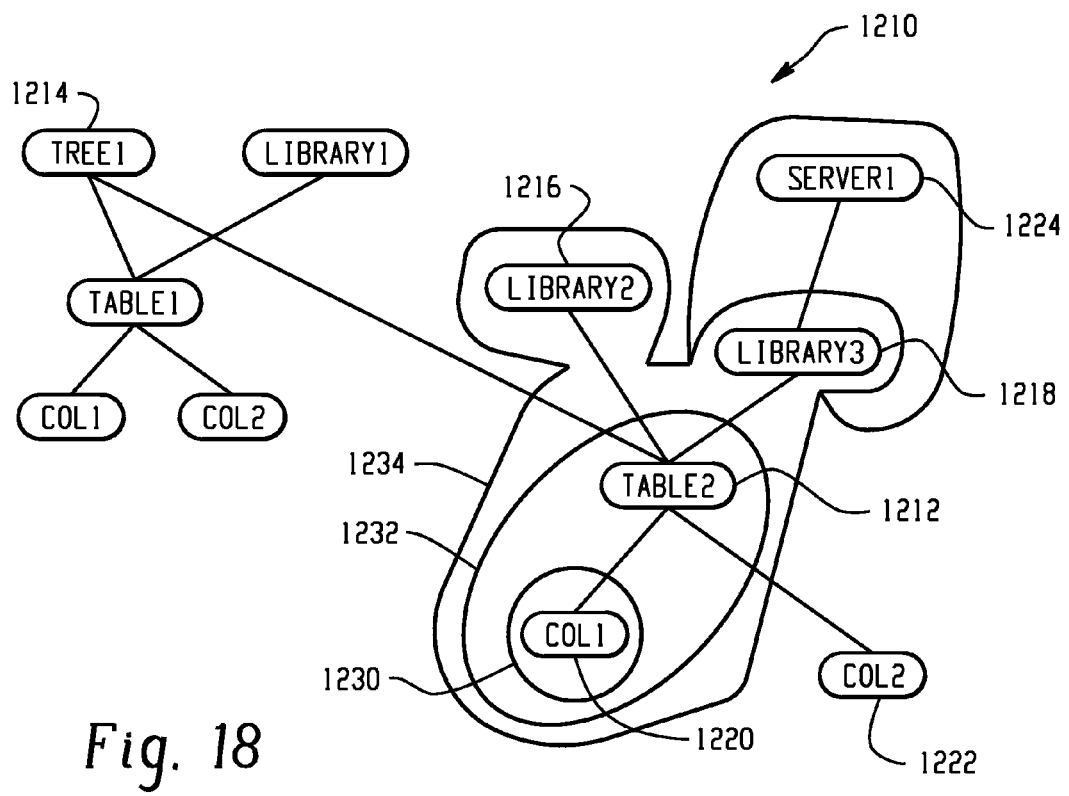
FIG. 18 is an object model diagram depicting a containment boundary being imposed by a data access security system.

As shown in FIG. 18, the data access security system can project one or more containment boundaries onto the object relationships. The access control decision for a given object may be determined at least in part upon its association with one or more related objects. Thus, a table (e.g., table2 1212) might acquire its security from its associated libraries (e.g., library2 1216 and library3 1218); a column (e.g., col1 1220) might acquire its security from its associated table (1212); and a library (e.g., library3 1218) could acquire its security from its servers (e.g., server1 1224).

Based upon an object's physical container and class type, security containment rules can specify different layers of containment. As an illustration, a containment boundary 1230 has been projected at the granular level of the col1 object level. A higher level containment boundary 1232 has been imposed collectively about the table2 and col1 objects (1212, 1220), as well as another boundary 1234 about the objects library2, library3, table2, and col1 (1216, 1218, 1212, 1220). The containment boundaries (1230, 1232, 1234) define who can have access and optionally what operations they may perform upon the objects. The containment layers may be imposed in an outward fashion in that a containment boundary 1230 may be first imposed with respect to the requested object 1220 (e.g., the object which is the subject of the request). As the security rules are processed, containment boundary 1232 is imposed with respect to both objects 1220 and 1212, and then containment boundary 1234 is imposed with respect to objects 1220, 1212, 1216, and 1218.

To impose containment boundaries, the security rules may take many different forms. An example is shown in FIGS. 19-21. FIG. 19 shows a table 1240 which maps security rules to class types. With reference to FIG. 19, column instances 1242 acquire their security from the object that is retrieved via its "OwningTable" association as specified by rule 1244. A DataTable object (of class type DataTable 1246) would acquire its security from the object that is retrieved via its "TablePackages" association as specified by rule 1248.

FIG. 20 shows an example where a DataTable object (of class type DataTable 1252) inherits its security from the objects that are retrieved via the Trees association and that match the condition of its TreeType attribute equaling 'Security' as specified by rule 1254.

FIG. 21 shows another example where rules for the RelationalTable class have been added as indicated at 1262 and 1264. In this example, the RelationalTable class is a subclass of DataTable. If the rules from the example of FIG. 20 were used, a RelationalTable object would acquire its security using the DataTable rules (e.g., rule 1254). With reference back to FIG. 21, if the "IGNORE_SUPERCLASS" rule 1264 were to be ignored, then a RelationalTable object would inherit security from both the DataTable rule (e.g., rule 1254) and the RelationalTable rule 1268. By adding in this example the "IGNORE_SUPERCLASS" rule 1264, the security rules are limited to those directly associated to the RelationalTable class.

It is further noted that the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

The invention claimed is:

1. A computer-implemented method for accessing resource objects, comprising:

receiving a request using one or more computer processors to perform an operation upon a resource object, wherein the request corresponds to access credential information associated with an identity and group membership, the access credential information including group membership priority information identifying a precedential order to be applied to the group membership by authorization precedence rules, wherein the resource object is associated with multiple other resource objects, authorization-related objects configured to specify whether access should be granted or denied to a requested object, and access permission information, and wherein association information is stored in one or more data stores;

using the authorization precedence rules to establish a precedential order based upon the particular identity and group membership associated with the request, wherein group membership includes one or more levels of membership, and wherein establishing a precedential order includes prioritizing values associated with levels such that lower values have priority over higher values in the precedential order;

querying the one or more data stores to determine which authorization-related objects are associated with the requested resource object;

querying the one or more data stores to determine which access permission information is associated with the determined authorization-related objects;

performing a comparison between the determined access permission information and the access credential information corresponding to the request, wherein the performing a comparison includes applying the precedential order to the access credential information corresponding to the request to determine if authorization to the requested resource object is granted or denied; and wherein if the comparison does not result in a determination of whether to permit the operation with respect to the resource object, then inheritance operations are performed, the inheritance operations including:

evaluating at least one security rule to determine whether to grant authorization to the requested resource object, the requested resource object having multiple associations with other objects, using the evaluated at least one security rule to determine a security containment boundary based upon an association between the requested resource object and another object, wherein determining a security containment boundary includes setting up security rules based on object class, and specifying how to traverse from an object of a class to an associated object, determine authorization information from the traversal, using the authorization information with identity information corresponding to a requester to determine whether to grant authorization to the requested resource object, and processing the request to the resource object based upon security access control information associated with the objects contained within the determined security containment boundary.

2. The method of claim 1, wherein an association is described by an association object with attributes that map the association between two objects of different types.

3. The method of claim 2, wherein based upon information derived from the request, the association objects are queried and intermediate query results are aggregated in order to determine whether to permit the operation with respect to the resource object.

4. The method of claim 3, wherein the information derived from the request includes an object reference for the resource object, requested permission, and access credential information.

5. The method of claim 3, wherein authorization-related objects include association objects that describe a linkage between two objects related by type;

wherein the association objects identify relationships involving identity and permission objects in order to determine which users are permitted to perform what actions on an object.

6. The method of claim 5, wherein the one or more data stores are provided on an object server;

wherein the object server is a multi-threaded, concurrent object server that handles object requests from users;

wherein the determination of whether to permit the operation with respect to the resource object is performed without requiring querying or instantiating of actual permission objects and reduces authorization processing requirements on the object server.

7. The method of claim 5, wherein the one or more data stores include an association table and a permissions data store;

wherein the permissions data store is an in-memory list of the permission objects.

8. The method of claim 5, wherein the request is received from a user;

wherein the user is associated with one or more GRANT/DENY user permissions with respect to the resource object;

wherein the user is a member of a group that is associated with one or more GRANT/DENY member permissions with respect to the resource object;

wherein the user's permissions and the user's member permissions are evaluated in order to determine whether to permit the operation with respect to resource object.

9. The method of claim 5, wherein based upon information derived from the request, the association objects are queried and intermediate query results are aggregated in order to determine whether to permit the accessing of the resource object;

wherein the querying to determine which authorization-related objects are associated with the requested resource object comprises a first query;

wherein the first query is performed to obtain association objects for all related access control entry objects corresponding to the requested resource object;

wherein the querying to determine which permissions are associated with the determined authorization-related objects comprises a second query;

wherein the second query reduces results of the first query to the association objects that represent the intersection of the access control entry object references returned from the first query and permission object references that correspond to the resource object's requested permission;

wherein a third query is performed upon the one or more data stores in order to determine association objects that represent the intersection of access control entry object references that associate to the required permission as reduced by the second query and the identity object references corresponding to the access credential information corresponding to the request;

wherein after the third query completes, a mapping established from the second query results is used to match permission information to the identity object references from the third query results;

wherein authorization precedence rules are applied to the matched permission corresponding authorization-related object references to determine if a user is granted or denied authorization to the requested resource object.

10. The method of claim 1, wherein an authorization control decision for the resource object is determined based upon the resource objects' association with a plurality of objects;

wherein security access control information of the associated objects is used to form the authorization control decision;

wherein the association with the plurality of objects includes both objects directly associated with the requested resource object and an object indirectly associated with the requested resource object;

wherein ancestor classes are classes from a class inheritance hierarchy;

wherein the inheritance operations further comprise:

determining for the requested resource object from which security rules to inherit based upon parents of the requested resource object as specified in the class inheritance hierarchy;

wherein the security rules are defined once on a parent class and affect all of its child classes with respect to object access determinations;

wherein child classes augment security rules inherited from their parents;

wherein at least one child class ignores one or more of the inheritable security rules from its one or more ancestor classes;

wherein a security rule specifies that at least one child class ignores one or more of the inheritable security rules from its one or more ancestor classes.

11. The method of claim 1, wherein the requester's access credential information corresponding to the request includes one or more credentials that determine access rights based upon one or more associations with one or more authorization-related objects, the method further comprising:

querying the one or more data stores in order to determine which of the access credentials corresponding to the request are associated with the determined authorization-related objects;

wherein a comparison is performed between the determined permissions and identity objects related to the determined access credentials corresponding to the request in order to determine whether to permit authorization with respect to the resource object.

12. The method of claim 1, wherein authorization-related objects are configured to specify what types of operations a requester can perform on a requested object.

13. The method of claim 1, wherein the querying to determine which permissions are associated with the determined authorization-related objects further includes querying the one or more data stores in order to determine which permissions are associated with the type of access being requested to be performed upon the resource object.

14. The method of claim 1, wherein information derived from the request includes an object reference, and wherein the querying steps only involve comparing object references.

15. The method of claim 1, wherein dynamically sized parallel array data structures maintain references to the objects and to precedence levels for the determined authorization-related objects.

16. A computer-implemented system for accessing resource objects, comprising:

a processor;

a computer-readable storage medium containing software instructions executable on the processor to cause the processor to perform operations including:

receiving a request to access a resource object, wherein the request corresponds to access credential information associated with an identity and group membership, the access credential information including group membership priority information identifying a precedential order to be applied to the group membership by authorization precedence rules, wherein the resource object is associated with other resource objects, authorization-related objects configured to specify whether access should be granted or denied to a requested object, and access permission information, and wherein association information is stored in one or more data stores;

using the authorization precedence rules to establish a precedential order based upon the particular identity and group membership associated with the request, wherein group membership includes one or more levels of membership, and wherein establishing a precedential order includes prioritizing values associated with levels such that lower values have priority over higher values in the precedential order;

querying the one or more data stores to determine which authorization-related objects are associated with the requested resource object;

querying the one or more data stores to determine which access permission information is associated with the determined authorization-related objects;

performing a comparison between the determined access permission information and the access credential information corresponding to the request, wherein the performing a comparison includes applying the precedential order to the access credential information corresponding to the request to determine if authorization to the requested resource object is granted or denied; and wherein if the comparison does not result in a determination of whether to permit the operation with respect to the resource object, then inheritance operations are performed, the inheritance operations including:

evaluating at least one security rule to determine whether to grant authorization to the requested resource object, the requested resource object having multiple associations with other objects, using the evaluated at least one security rule to determine a security containment boundary based upon an association between the requested resource object and another object, wherein determining a security containment boundary includes setting up security rules based on object class, and specifying how to traverse from an object of a class to an associated object, determining authorization information from the traversal, using the authorization information with identity information corresponding to a requester to determine whether to grant authorization to the requested resource object, and processing the request to the resource object based upon security access control information associated with the objects contained within the determined security containment boundary.

17. The method of claim 15, wherein all object references in the parallel array data structures are in contiguous memory and delimited for direct use in an IN clause of a query statement.

18. The method of claim 15, wherein the dynamically sized parallel array data structures include an object references away for storing object references of the determined authorization-related objects; and wherein the dynamically sized parallel array data structures include a precedence levels array for storing permission and identity information associated with a determined authorization-related object.

19. Computer-readable storage medium encoded with instructions that when executed, cause a computer to perform a data structure conversion method, comprising:

receiving a request to access a resource object, wherein the request corresponds to access credential information associated with an identity and group membership, the access credential information including group membership priority information identifying a precedential order to be applied to the group membership by authorization precedence rules, wherein the resource object is associated with other resource objects, authorization-related objects configured to specify whether access should be granted or denied to a requested object, and access permission information, and wherein association information is stored in one or more data stores;

using the authorization precedence rules to establish a precedential order based upon the particular identity and group membership associated with the request, wherein group membership includes one or more levels of membership, and wherein establishing a precedential order includes prioritizing values associated with levels such that lower values have priority over higher values in the precedential order;

querying the one or more data stores to determine which authorization-related objects are associated with the requested resource object;

querying the one or more data stores to determine which access permission information is associated with the determined authorization-related objects;

performing a comparison between the determined access permission information and the access credential information corresponding to the request, wherein the performing a comparison includes applying the precedential order to the access credential information corresponding to the request to determine if authorization to the requested resource object is granted or denied; and wherein if the comparison does not result in a determination of whether to permit the operation with respect to the resource object, then inheritance operations are performed, the inheritance operations including:

evaluating at least one security rule to determine whether to grant authorization to the requested resource object, the requested resource object having multiple associations with other objects, using the evaluated at least one security rule to determine a security containment boundary based upon an association between the requested resource object and another object, wherein determining a security containment boundary includes setting up security rules based on object class, and specifying how to traverse from an object of a class to an associated object, determining authorization information from the traversal, using the authorization information with identity information corresponding to a requester to determine whether to grant authorization to the requested resource object, and processing the request to the resource object based upon security access control information associated with the objects contained within the determined security containment boundary.

\* \* \* \* \*

UNITED STATES PATENT AND TRADEMARK OFFICE
CERTIFICATE OF CORRECTION

PATENT NO. : 7,644,086 B2 Page 1 of 1
APPLICATION NO. : 11/092138
DATED : January 5, 2010
INVENTOR(S) : Boozer et al.

It is certified that error appears in the above-identified patent and that said Letters Patent is hereby corrected as shown below:

In column 17, line 23, delete "away" and insert -- array --.

Signed and Sealed this

Sixth Day of April, 2010

David J. Kappos
*Director of the United States Patent and Trademark Office*